United States Patent
Kim et al.

(10) Patent No.: US 9,630,728 B2
(45) Date of Patent: Apr. 25, 2017

(54) HEIGHT-ADJUSTABLE ROTUNDA-TYPE BOARDING BRIDGE

(71) Applicants: KOREA AIRPORTS CORPORATION, Seoul (KR); AG CO., LTD., Seoul (KR)

(72) Inventors: Dong Soo Kim, Gyeonggi-do (KR); Tae Guen Yu, Seoul (KR); Kwang Ho Yang, Seoul (KR)

(73) Assignees: Korea Airports Corporation, Seoul (KR); AG CO, LTD., Seoul (KR)

( * ) Notice: Subject to any disclaimer, the term of this patent is extended or adjusted under 35 U.S.C. 154(b) by 0 days.

(21) Appl. No.: 14/960,944

(22) Filed: Dec. 7, 2015

(65) Prior Publication Data

US 2016/0083114 A1   Mar. 24, 2016

Related U.S. Application Data

(63) Continuation of application No. PCT/KR2014/001720, filed on Mar. 3, 2014.

(30) Foreign Application Priority Data

Jun. 7, 2013 (KR) .................. 10-2013-0065353

(51) Int. Cl.
 *E01D 15/02* (2006.01)
 *B64F 1/305* (2006.01)
(52) U.S. Cl.
 CPC .......... *B64F 1/305* (2013.01); *B64F 1/3055* (2013.01); *E01D 15/02* (2013.01)
(58) Field of Classification Search
 CPC ................. B64F 1/305; E01D 15/02

USPC .......................... 14/69.5, 71.3–72.5
See application file for complete search history.

(56) References Cited

U.S. PATENT DOCUMENTS

| | | | | |
|---|---|---|---|---|
| 2,875,457 A | * | 3/1959 | Read | B64F 1/3055 104/20 |
| 3,728,754 A | * | 4/1973 | Lodjic | B64F 1/305 14/71.5 |
| 3,883,918 A | * | 5/1975 | Magill | B64F 1/3055 14/71.5 |
| 4,761,846 A | * | 8/1988 | Cox | E01D 15/24 114/230.1 |
| 6,330,726 B1 | | 12/2001 | Hone et al. | |
| 6,496,996 B1 | * | 12/2002 | Worpenberg | B64F 1/3055 14/71.5 |
| 7,603,734 B2 | * | 10/2009 | Connelly | B64F 1/305 14/69.5 |
| 2003/0145405 A1 | * | 8/2003 | Hutton | B64F 1/3055 14/71.5 |
| 2007/0084001 A1 | * | 4/2007 | Anderberg | B64F 1/3055 14/71.5 |

(Continued)

FOREIGN PATENT DOCUMENTS

| | | |
|---|---|---|
| JP | 2006-096298 A | 4/2006 |
| JP | 2012-153337 A | 8/2012 |
| WO | WO 03/064255 A1 | 8/2003 |

*Primary Examiner* — Raymond W Addie
(74) *Attorney, Agent, or Firm* — Riverside Law LLP

(57) ABSTRACT

A boarding bridge includes: a fixed tunnel of which one end is connected to a terminal or an extended fixed tunnel; and a rotunda of which one end is connected to the other end of the fixed tunnel and which is supported by a rotunda column. The rotunda column is driven to raise or lower the rotunda.

10 Claims, 12 Drawing Sheets

(56) References Cited

U.S. PATENT DOCUMENTS

2008/0109970 A1\* 5/2008 Hutton .................... B64F 1/002
 14/71.5
2010/0325818 A1\* 12/2010 Okahira ................ B64F 1/3055
 14/71.5

\* cited by examiner

*FIG. 12*

| B-747 | B-777 | B-767 | B-737 |
|-------|-------|-------|-------|
| A-330 | A-300 | Q-400 | F-100 |

HEIGHT-ADJUSTABLE ROTUNDA-TYPE BOARDING BRIDGE

CROSS-REFERENCE TO RELATED APPLICATIONS

This application is a continuation application claiming benefit to International Patent Application No. PCT/KR2014/001720, filed on Mar. 3, 2014, which is entitled to priority under 35 U.S.C. §119(a)-(d) to Korea application no. 10-2013-0065353, filed Jun. 7, 2013, each of which application is hereby incorporated herein by reference in its entirety.

TECHNICAL FIELD

The present disclosure relates to a height-adjustable rotunda-type boarding bridge.

BACKGROUND

A boarding bridge is a bridge in the form of a machine for transferring passengers between an airplane and an airport terminal. Typically, the boarding bridge includes a fixed tunnel installed from the terminal to a rotunda and a movable boarding bridge or a fixed boarding bridge installed between the rotunda and the airplane. If the movable boarding bridge is installed between the rotunda and the airplane, the movable boarding bridge can change a direction and move to be adjacent to the airplane by using the wheels.

The Korean Law and IATA limit an inclination of a slope of a boarding bridge to 4.7 degrees up and down to prevent inconvenience to the disabled. In order to keep the inclination, when a boarding bridge is designed, available airplane types are predetermined on the basis of a height of a rotunda and a height of a building, and a boarding bridge service is not provided to other airplanes.

Such a limitation on an inclination of a slope of a boarding bridge protects the disabled, but causes inconvenience that passengers need to be remotely transferred to an airplane, which is not one of the available airplane types, even when the boarding bridge is not used. Therefore, a time for processing the airplane is extended, and the passengers need to go outside to get on a separate transport means such as a shuttle bus.

DISCLOSURE OF THE INVENTION

Problems to be Solved by the Invention

There is provided a boarding bridge which can be docked on various kinds of airplanes and enables passengers to move conveniently by keeping an inclination of the gentlest slope while observing the standards of an inclination of the slope of the boarding bridge.

Means for Solving the Problems

In a first exemplary embodiment of the present disclosure, a boarding bridge includes: a fixed tunnel of which one end is connected to a terminal or an extended fixed tunnel; and a rotunda of which one end is connected to the other end of the fixed tunnel and which is supported by a rotunda column. The rotunda column may be driven to raise or lower the rotunda.

In a second exemplary embodiment of the present disclosure, a boarding bridge height control system configured to raise or lower the rotunda included in the boarding bridge according to the first exemplary embodiment of the present disclosure includes: a flight management server in which data of flight information including information about arrival gates for airplanes, information about flight numbers parked at respective gates, and information about airplane types are stored and updated; and a control unit configured to receive the flight information from the flight management server and raise or lower the rotunda.

Effects of the Invention

According to the above-described exemplary embodiments of the present disclosure, since a rotunda is raised and lowered by using a rotunda column, a boarding bridge can be docked on various kinds of airplanes. Further, since the overall slope of the boarding bridge can be kept at the gentlest inclination, passengers can move conveniently.

BRIEF DESCRIPTION OF THE DRAWINGS

FIG. 12 is a conceptual diagram of an airplane type select button for adjusting a height of a rotunda.

MODE FOR CARRYING OUT THE INVENTION

Figure 1:
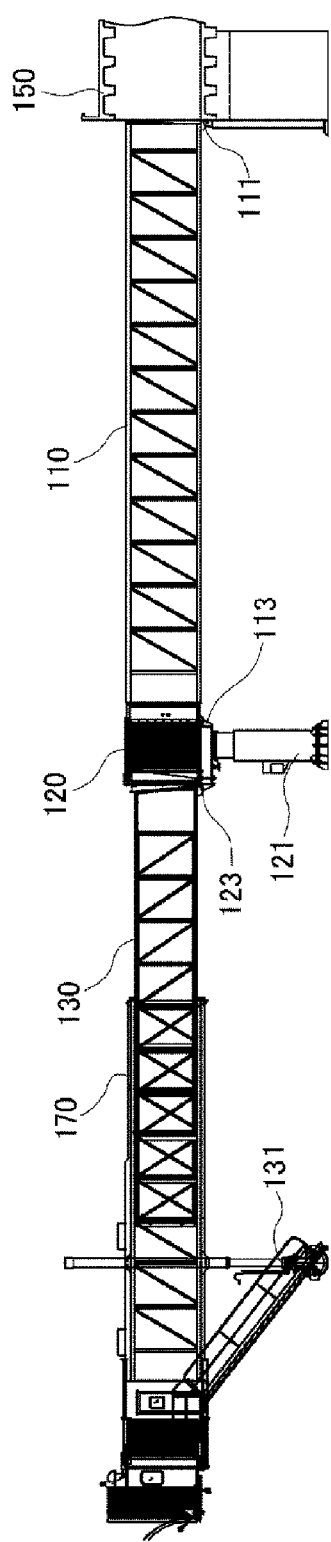
FIG. 1 is a side view of a boarding bridge according to an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Hereinafter, the present disclosure will be described in detail with reference to the accompanying drawings.

Firstly, a boarding bridge according to an exemplary embodiment of the present disclosure (hereinafter, referred to as "the present boarding bridge") will be described.

The present boarding bridge includes a fixed tunnel 110.

Figure 2:
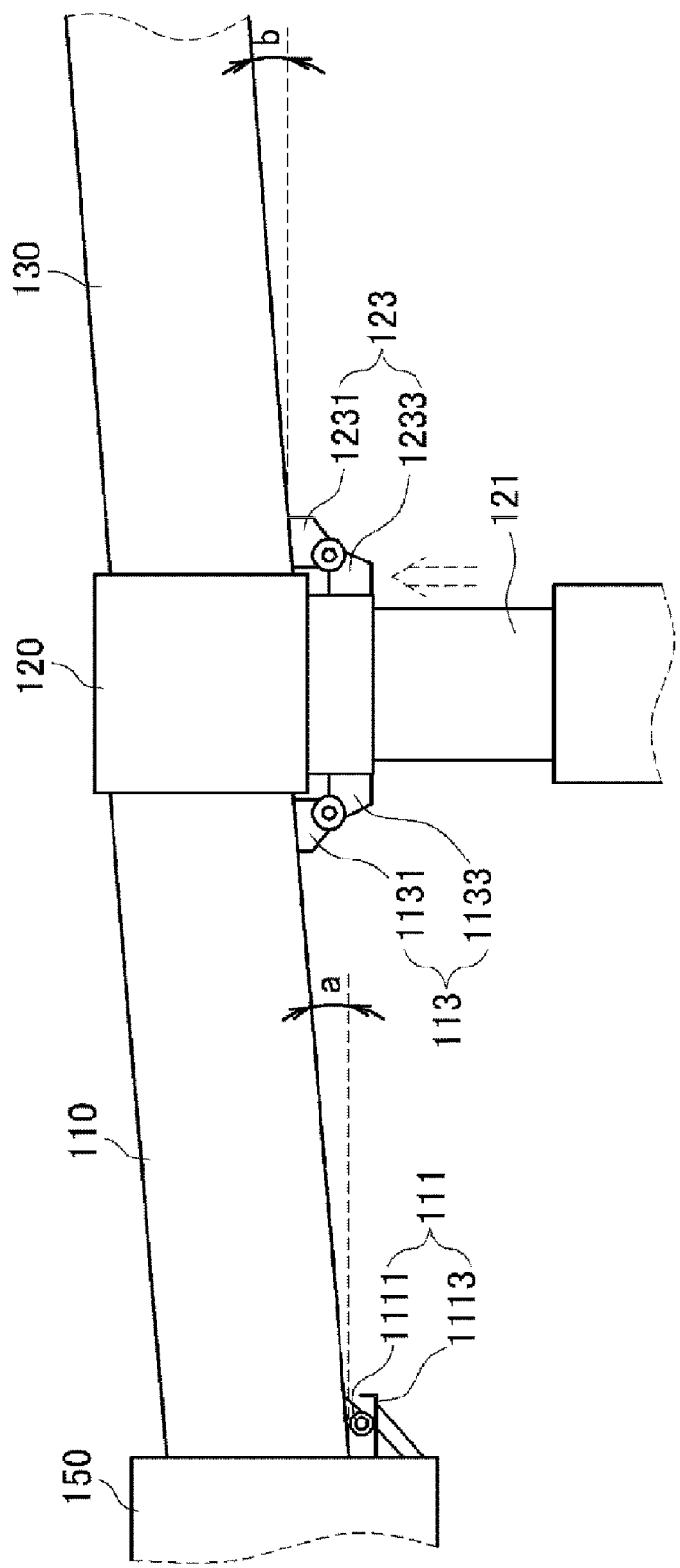
FIG. 2 is a schematic diagram illustrating that when a rotunda is raised by a rotunda column, a fixed tunnel and a movable tunnel are rotated by a hinge unit.

Referring to FIG. 1 and FIG. 2, one end of the fixed tunnel 110 is connected to a terminal 150. Otherwise, referring to FIG. 4, one end of the fixed tunnel 110 is connected to an extended fixed tunnel 190. The extended fixed tunnel 190 may be provided if the terminal 150 is too far from an airplane and only the single fixed tunnel 110, a movable tunnel 130 and an extended tunnel 170 are not sufficient to connect them.

Conventionally, an inclination and a position of the fixed tunnel 110 are not adjusted, and the fixed tunnel 110 is fixedly connected to a rotunda 120 in a straight line. Therefore, conventionally, by adjusting only a movable boarding bridge of which an inclination and a position can be adjusted, a boarding gate of an available airplane is connected to the rotunda 120.

Meanwhile, the fixed tunnel 110 included in the present boarding bridge can be rotated up and down with respect to the rotunda 120 and thus an inclination thereof can be adjusted, as illustrated in FIG. 2. Details thereof will be described later.

Figure 9:
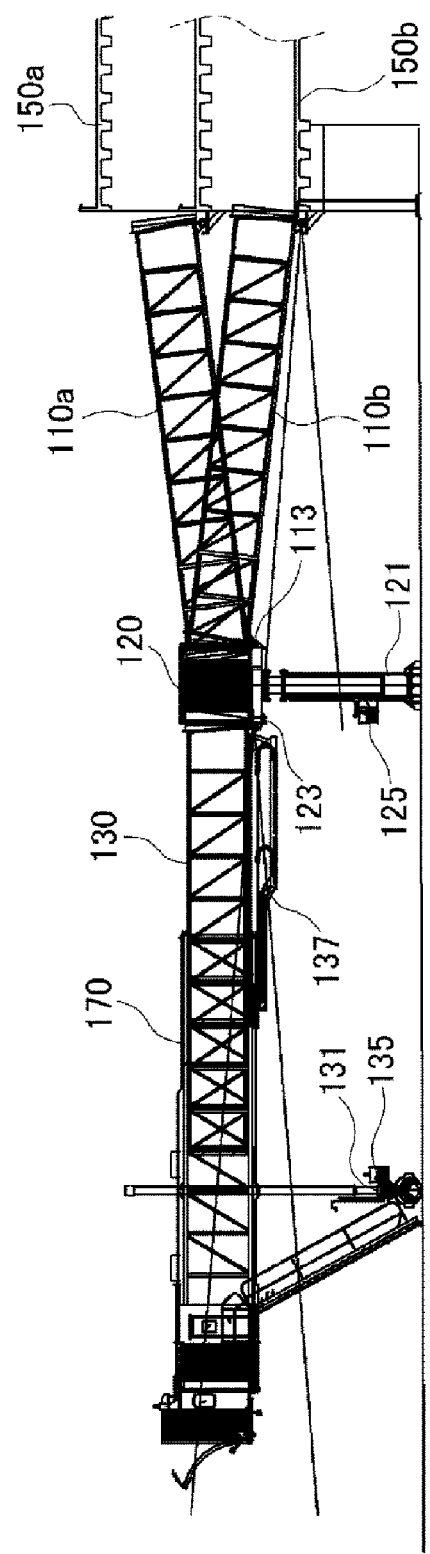
FIG. 9 is a side view of a boarding bridge when multiple fixed tunnels are connected in parallel to each other.

Referring to FIG. 9, the fixed tunnel 110 may include a first fixed tunnel 110*a* connected to the rotunda 120. Further, the fixed tunnel 110 may include a second fixed tunnel 110*b* connected to the rotunda 120 to be arranged in parallel to the first fixed tunnel 110*a*.

As illustrated in FIG. 9, the two fixed tunnels 110*a* and 110*b* may be connected to the single rotunda 120. The other ends of the fixed tunnels 110*a* and 110*b* may be respectively connected to different floors of the terminal 150. In this case, the rotunda 120 may be formed to have a large area to accommodate all of one ends of the two fixed tunnels 110*a* and 110*b*, as compared with the case where the rotunda 120 is connected to the single fixed tunnel.

By way of example, if the exit for passengers from the terminal 150 is on the third floor and the entrance to the terminal 150 is on the second floor, the first fixed tunnel 110*a* may be connected to the second floor of the terminal 150 and the second fixed tunnel 110*b* may be connected to the third floor of the terminal 150. As such, since traffic lines of passengers are separated by the multiple fixed tunnels 110*a* and 110*b*, it is possible to suppress congestion of the terminal caused by mixing of passengers entering the terminal 150 and passengers exiting the terminal 150.

The present boarding bridge includes the rotunda 120.

Referring to FIG. 1 and FIG. 2, one end of the rotunda 120 is connected to the other end of the fixed tunnel 110.

The present boarding bridge may include the movable tunnel 130.

Referring to FIG. 1, the movable tunnel 130 may connect the rotunda 120 to an airplane.

As illustrated in FIG. 1, the movable tunnel 130 has wheels at a lower part and thus enables the rotunda 120 to be connected to the airplane.

Herein, the movable tunnel 130 may be connected to the other end of the rotunda 120.

Figure 10:
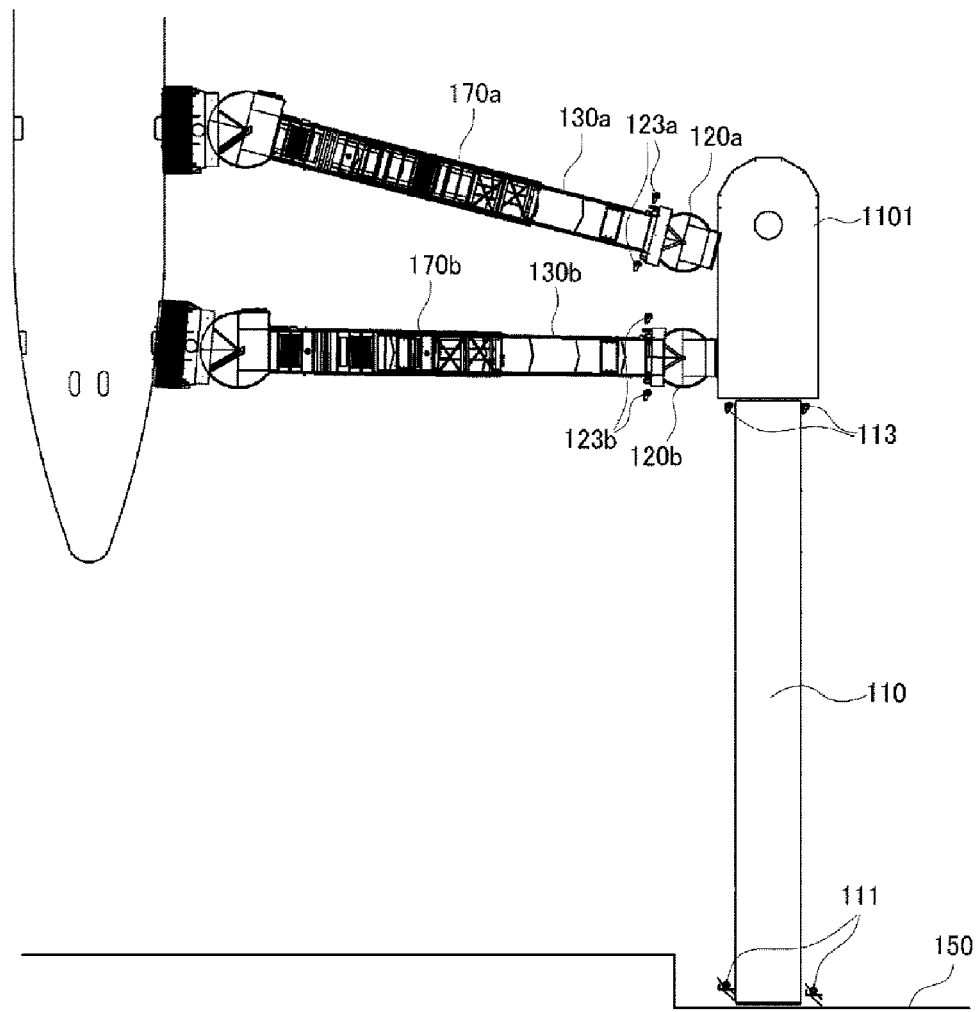
FIG. 10 is a plane view of a boarding bridge when each of multiple rotundas and multiple movable tunnels is connected to one fixed tunnel.

Referring to FIG. 10, multiple rotundas 120*a* and 120*b* and multiple movable tunnels 130*a* and 130*b* may be provided. Herein, the movable tunnels 130*a* and 130*b* may be connected to the rotundas 120*a* and 120*b* one to one.

By way of example, a large airplane (e.g., B-747) such as a Grade E airplane may include multiple boarding gates in order for passengers to quickly get off the airplane. As such, if there are multiple boarding gates, multiple movable boarding bridges (the movable tunnel 130 and the extended tunnel 170) and multiple rotundas 120 may be connected to the respective boarding gates.

As illustrated in FIG. 9, if there are two boarding gates, two boarding bridges connected to the respective boarding gates are referred to as a double bridge.

As such, if the multiple rotundas 120*a* and 120*b* and the multiple movable tunnels 130*a* and 130*b* are provided, for example, a hydraulic device 125 may be provided in the rotundas 120*a* and 120*b* in order for all of the rotundas 120*a* and 120*b* to be raised or lowered.

Figure 4:
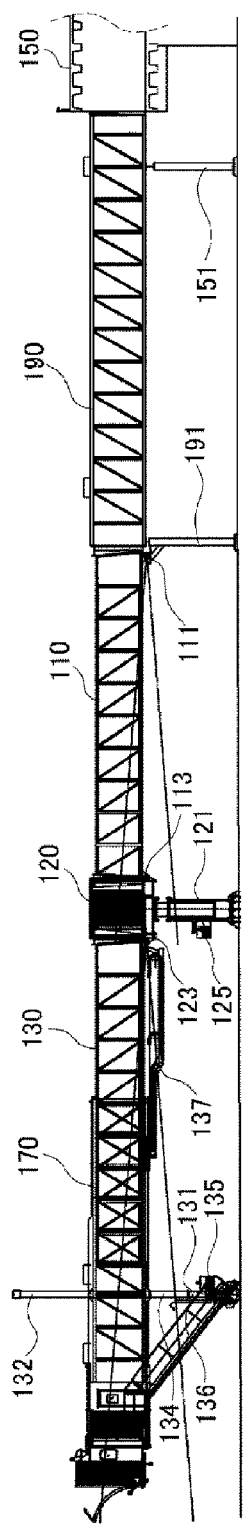
FIG. 4 is a perspective view illustrating an example where a hinge used for adjusting an inclination of a boarding bridge according to an exemplary embodiment of the present disclosure is a fixed hinge.
Figure 5:
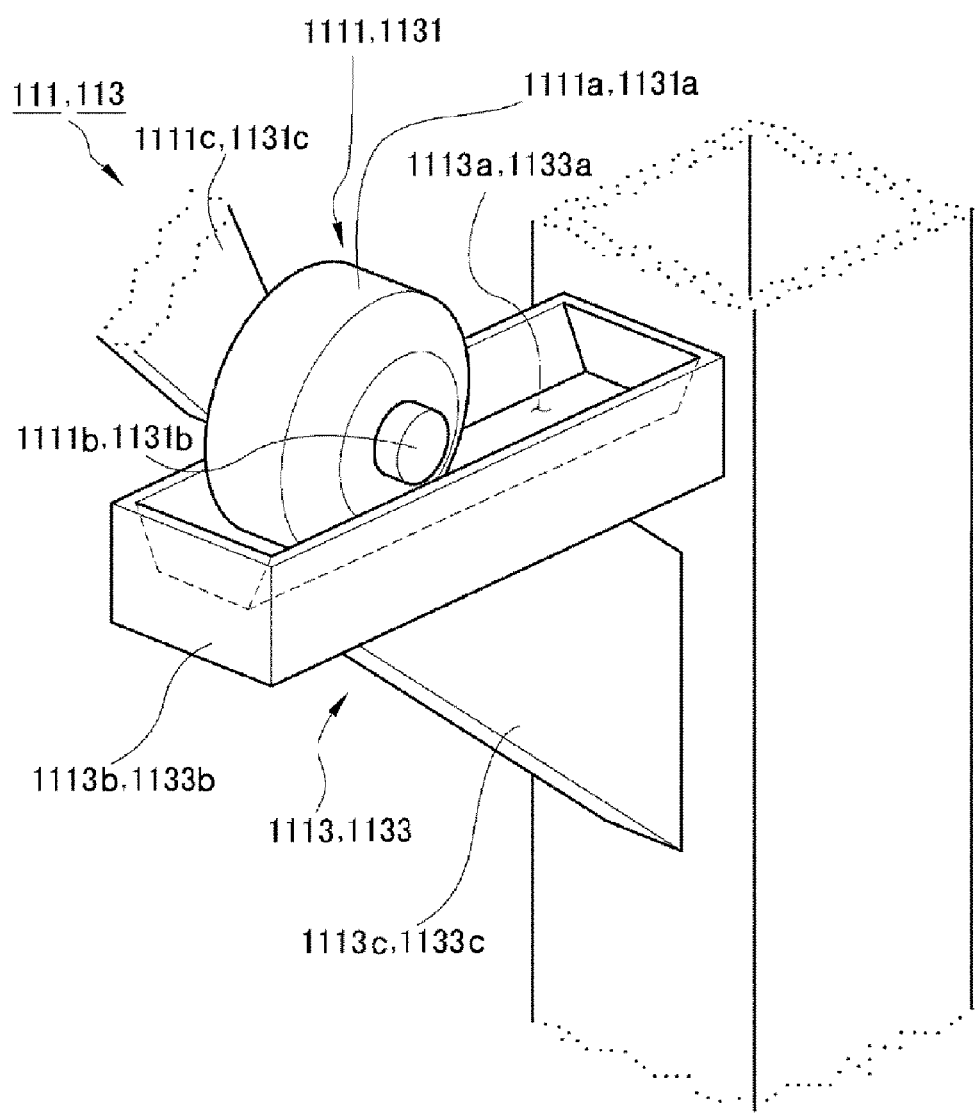
FIG. 5 is a perspective view illustrating an example where a first hinge unit or a second hinge unit is a sliding hinge.

When the rotundas 120*a* and 120*b* are raised or lowered, a first hinge unit 111 and a second hinge unit 113 may be provided in the fixed tunnel 110 and third hinge units 123*a* and 123*b* may be provided in the movable tunnels 130*a* and 130*b* to respectively correspond to the raising and lowering thereof. Herein, the first hinge unit 111 may be a sliding hinge as illustrated in FIG. 5, and the second hinge unit 113 and the third hinge units 123*a* and 123*b* may be fixed hinges as illustrated in FIG. 4. Further, the second hinge unit 113 may be provided at a head unit 1101 of the fixed tunnel 110 as illustrated in FIG. 10.

Further, the other side of the movable tunnel 130 may be raised or lowered. In this case, a driving unit 131 configured to raise or lower the other side of the movable tunnel 130 may be provided on the other side of the movable tunnel 130.

Herein, the driving unit 131 may include a hydraulic device 135 in addition to the hydraulic device 125 as a raising and lowering unit, as illustrated in FIG. 4.

By way of example, referring to FIG. 4, an outer column 134 slides from an inner column 136 by a hydraulic power generated from a hydraulic power unit provided in a lift column 132, and the movable tunnel 130 connected to the outer column 134 can be moved up and down. Thus, a height of the movable tunnel 130 can be suitably adjusted to a sill of the airplane.

Herein, since the movable tunnel 130 can operate back and forth and side to side, and can be driven forward by the wheels provided at the lower part of the movable tunnel 130, the movable tunnel 130 can be accurately docked on a boarding gate of the airplane.

Otherwise, the driving unit 131 may be driven as being connected to the hydraulic device 125 as a raising and lowering unit, as described below.

Referring to FIG. 1, the other end of the movable tunnel 130 may be further connected to the extended tunnel 170. Since a part of the movable tunnel 130 is inserted into the extended tunnel 170 by sliding and moving the extended tunnel 170, it is possible to adjust an overall length of the boarding bridge as necessary.

If the extended tunnel 170 is provided on the other side of the movable tunnel 130, the driving unit 131 may be provided in the extended tunnel 170. In this case, the extended tunnel 170 and the movable tunnel 130 may be raised or lowered together.

The movable tunnel 130 can be rotated around an axis in a horizontal direction.

Herein, the horizontal direction includes not only a perfectly horizontal direction, but also an obliquely horizontal direction in an allowable range.

That is, the movable tunnel 130 may be rotated up and down around an axis in an approximately horizontal direction.

Herein, the movable tunnel 130 can be rotated to 4.7 degrees up and down around an axis in a horizontal direction according to the standards of the Korean Law and the like.

As illustrated in FIG. 1 and FIG. 2, the rotunda 120 is supported by a rotunda column 121. The rotunda column 121 may raise or lower the rotunda 120 as illustrated in FIG. 2.

Conventionally, the rotunda column 121 fixes and supports the rotunda 120, and, thus, a height of the rotunda 120 is uniformly maintained. The IATA (International Air Transport Association) limits an inclination of a slope of a boarding bridge to 4.7 degrees up and down. If a boarding bridge is designed following the rules, a height of a rotunda is fixed and an inclination of a movable tunnel can be adjusted only in a predetermined range. Thus, airplane types available for the boarding bridge are limited. That is, conventionally, when a boarding bridge is designed, available airplane types are predetermined on the basis of a height of a rotunda and a height of a building, and a boarding bridge service is not provided to other airplanes.

Such a limitation on an inclination of a slope of a boarding bridge protects the disabled, but causes inconvenience that passengers need to be remotely transferred to an airplane, which is not one of the available airplane types, even when the boarding bridge is not used. Therefore, a time for processing the airplane is extended, and the passengers need to go outside to get on a separate transport means such as a shuttle bus. Further, a movable tunnel inclined at 4.7 degrees as the limited angle may cause inconvenience to the disabled, as compared with a gently inclined boarding bridge.

Further, if a fixed tunnel is constructed with an inclination of 4.7 degrees as the limited angle, the inclination of the fixed tunnel is fixed. Therefore, available airplane types cannot be changed.

Accordingly, in the present boarding bridge, a height of the rotunda 120 can be adjusted. Thus, airplane types available for the boarding bridge can be diversified. Therefore, the present boarding bridge can overcome the problem of the conventional boarding bridge.

To be more specific, in the present boarding bridge, an inclination of the movable tunnel 130 is determined (as 4.7 degrees up and down) according to the above-described rules. However, if it is necessary to dock the boarding bridge on an airplane with a boarding gate at a high position of the airplane, the rotunda 120 is raised and an inclination of the fixed tunnel 110 connected to the rotunda 120 is adjusted to correspond to the raising, and then, an inclination of the movable tunnel 130 is adjusted to be connected to the boarding gate of the airplane. As such, the boarding bridge can be docked on the airplane. On the other hand, if it is necessary to dock the boarding bridge on an airplane with a boarding gate at a low position of the airplane, the rotunda 120 is lowered and an inclination of the fixed tunnel 110 connected to the rotunda 120 is adjusted to correspond to the lowering, and then, an inclination of the movable tunnel 130 is adjusted to be connected to the boarding gate of the airplane. As such, the boarding bridge can be docked on the airplane. That is, the present boarding bridge can be docked on all kinds of airplanes without limitations on available airplane types by appropriately raising or lowering the rotunda 120. Further, since passengers can get on the plane through the boarding bridge connected to the terminal 150, it is possible to eliminate a conventional inconvenience that passengers need to get on an airplane through a separate transport means.

Further, the present boarding bridge can be set to have an overall gentle inclination, as compared with a conventional one, and thus enables the passengers to move more conveniently.

To be specific, if it necessary to dock a boarding bridge on an airplane with a boarding gate at a high position of the airplane, conventionally, a height of a rotunda is fixed and thus a movable terminal is inclined as much as possible to increase a height of the other end of the movable tunnel as much as possible (for example, the movable tunnel is inclined at 4.7 degrees). As such, the boarding bridge can be docked on the airplane. In this case, the boarding bridge is inclined at the maximum angle, which may cause inconvenience to passengers.

Meanwhile, in the present boarding bridge, the fixed tunnel 110 can be inclined (for example, at about 2 degrees to about 3 degrees) toward the same airplane by raising the rotunda 120. Thus, by slightly inclining the movable tunnel 130 (for example, at about 1 degree to about 2 degrees), the boarding bridge can be docked on the airplane. That is, the present boarding bridge can be docked on the airplane, on which the boarding bridge can be conventionally docked by inclining the movable tunnel 130 as much as possible, by raising the rotunda 120 without inclining the movable tunnel 130 as much as possible. Therefore, the present boarding bridge can be set to have an overall gentle inclination, as compared with a conventional one, and thus enables the passengers to move more conveniently.

In particular, an inclination of the fixed tunnel 110 can be adjusted to correspond to the raising or lowering of the rotunda 120. Therefore, it is possible to appropriately adjust the inclination of the fixed tunnel 110 in order for the movable tunnel 130 not to be inclined to the limited angle and thus possible to offer convenience to the disabled.

An operation of the rotunda column 121 may be controlled through an operating panel.

If a height of an incoming airplane is selected through the operating panel, the rotunda column 121 may automatically adjust a height of the rotunda 120 according to previously stored data.

The operating panel may drive the rotunda column 121 according to a height of an airplane, on which the boarding bridge is docked, before a predetermined time from an arrival time of the airplane. As such, the height of the rotunda 120 is automatically adjusted in advance through the operating panel. Then, after a waiting time, if the airplane is stopped, an operator may move the movable tunnel to be docked on the door of the airplane. Therefore, it is possible to easily dock the boarding bridge on the airplane.

Herein, the term "before a predetermined time" may mean a time point before the movable tunnel is connected to the rotunda 120.

The rotunda column 121 includes a raising and lowering unit. Therefore, the rotunda 120 may be raised or lowered by the raising and lowering unit.

By way of example, the raising and lowering unit may be the hydraulic device 125.

Figure 8:
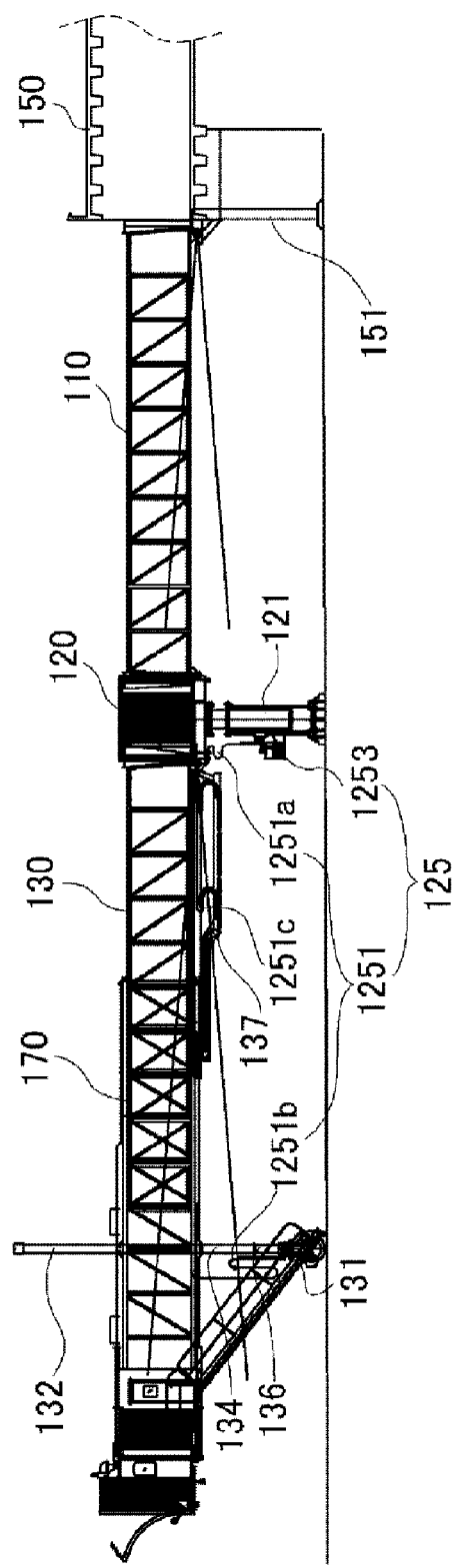
FIG. 8 is a side view of a boarding bridge when a cable chain is provided under a movable tunnel.

Referring to FIG. 8, the hydraulic device 125 may include a hydraulic power unit 1253 and a hydraulic hose 1251 configured to transfer a hydraulic power generated from the hydraulic power unit 1253.

In this case, by way of example, a supporting column including a hollow is provided. The hydraulic device is inserted into the hollow, and a column is inserted on the hydraulic device. Thus, the column may be slid up and down within the supporting column by the hydraulic device to raise and lower the rotunda 120.

Herein, referring to FIG. 8, the hydraulic hose 1251 is connected to the driving unit 131 and thus may operate the driving unit 131 through the hydraulic power unit 1253 of the raising and lowering unit.

By way of example, as described above, a driving force for driving the lift column 132 is needed in order to raise or lower the movable tunnel 130. Therefore, since the hydraulic device 125 as the raising and lowering unit is configured to raise or lower the rotunda 120 and also drive the driving unit 131 as being connected thereto, a height of the movable tunnel 130 can be adjusted.

To be more specific, referring to FIG. 8, the hydraulic hose 1251 connected to the hydraulic power unit 1253 is laid in a cable chain 137 provided under the movable tunnel 130 and extended and connected to the lift column 132. Thus, the hydraulic device 125 configured to raise or lower the rotunda 120 can drive the lift column 132.

In this case, raising and lowering of both of the rotunda 120 and the movable tunnel 130 can be controlled with a single driving device only. Thus, it is possible to reduce the cost and also implement an efficient boarding bridge raising and lowering system.

The hydraulic hose 1251 may be formed to have a flexible shape to correspond to raising and lowering of the rotunda 120.

Herein, the hydraulic hose 1251 may include a first flexible part 1251a which is flexibly connected to the hydraulic device 125 to maintain the connection when the rotunda 120 is raised or lowered. Further, the hydraulic hose 1251 may include a second flexible part 1251b which is flexibly connected to the driving unit 131 to maintain the connection when the other side of the movable tunnel 130 is raised or lowered.

The first flexible part 1251a may be provided on one side of the movable tunnel 130, and the second flexible part 1251b may be provided on the other side of the movable tunnel 130.

Herein, referring to FIG. 8, when the rotunda 120 is raised or lowered, an amount of vertical movement of the other side of the movable tunnel 130 is greater than an amount of vertical movement of one side of the movable tunnel 130, desirably, the second flexible part 1251b may be formed to have a greater length than the first flexible part 1251a in order to compensate for such a difference.

By way of example, the first flexible part 1251a may be provided as having a repeatedly bent shape, as illustrated in FIG. 8. FIG. 8 illustrates the first flexible part 1251a as having an S-shape which is bent twice widthwise, but the first flexible part 1251a is not limited thereto. The first flexible part 1251a may be repeatedly bent in order for the first flexible part 1251a to sufficiently compensate for the amount of vertical movement of one side of the movable tunnel 130 (amount of elevation of the rotunda 120), or may have various shapes.

Further, by way of example, the second flexible part 1251b may be provided as having a repeatedly bent shape, as illustrated in FIG. 8. FIG. 8 illustrates the second flexible part 1251b as having a 90-degree rotated S-shape which is bent twice lengthwise, but the second flexible part 1251b is not limited thereto. The second flexible part 1251b may be repeatedly bent in order for the second flexible part 1251b to sufficiently compensate for the amount of vertical movement of the other side of the movable tunnel 130 (amount of elevation of the rotunda 120), or may have various shapes.

Further, the hydraulic hose 1251 may include a third flexible part 1251c which is flexibly connected to the cable chain 137 to maintain the connection when the extended tunnel 170 extendably connected to the movable tunnel 130 in a longitudinal direction is slid and moved.

Referring to FIG. 8, if the extended tunnel 170 is moved in a direction in which the overall length of the boarding bridge is increased, a bent portion of the third flexible part 1251c is unbent. Thus, a length of the hydraulic hose 1251 is increased in the longitudinal direction of the movable tunnel 130. Therefore, the connection between the hydraulic hose 1251 and the driving unit 131 can be maintained. On the other hand, if the extended tunnel 170 is moved in a direction in which the overall length of the boarding bridge is decreased, the third flexible part 1251c is bent again. Thus, a length of the hydraulic hose 1251 is decreased in the longitudinal direction of the movable tunnel 130. The third flexible part 1251c may be provided in the cable chain 137 as such.

As another example, the raising and lowering unit may be a screw jack (not illustrated). However, a kind of the raising and lowering unit is not limited thereto. The raising and lowering unit may include various devices capable of raising and lowering the rotunda 120 such as an electric lift.

Herein, the fixed tunnel 110 may be hinge-connected to the terminal 150 or the extended fixed tunnel 190 to rotate one end of the fixed tunnel 110 around an axis in a horizontal direction and may be hinge-connected to the rotunda 120 to rotate the other end of the fixed tunnel 110 around the axis in the horizontal direction. In other words, the fixed tunnel 110 may be rotated up and down with respect to the rotunda 120 to correspond to raising and lowering of the rotunda 120.

Herein, the horizontal direction includes not only a perfectly horizontal direction, but also an obliquely horizontal direction in an allowable range, as described above.

Conventionally, the fixed tunnel 110 is fixedly connected to the rotunda 120, and, thus, an inclination thereof cannot be adjusted.

Meanwhile, in the present boarding bridge, the rotunda 120 can be raised or lowered, and, thus, an inclination of the fixed tunnel 110 can be adjusted to correspond to the raising and lowering of the rotunda 120.

Referring to FIG. 2, if the rotunda 120 is raised, the other end of the fixed tunnel 110 is raised together. Therefore, the fixed tunnel 110 may be rotated in a downward direction with respect to the rotunda 120. On the other hand, although not illustrated in the drawing, if the rotunda 120 is lowered, the fixed tunnel 110 is lowered together with the rotunda 120. Therefore, the fixed tunnel 110 may be rotated in an upward direction with respect to the rotunda 120.

Figure 3:
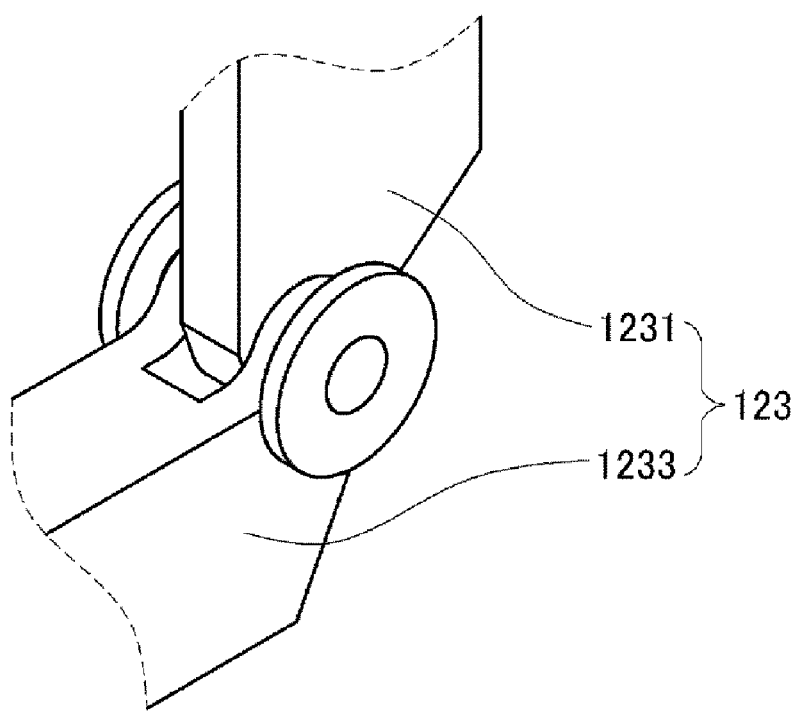
FIG. 3 is a side view of a boarding bridge when an extended fixed tunnel is connected between a fixed tunnel and a terminal.

As illustrated in FIG. 3, if the extended fixed tunnel 190 is further provided between the fixed tunnel 110 and the terminal, the extended fixed tunnel 190 connected to the terminal 150 is not inclined, but only the fixed tunnel 110 adjacent to the rotunda 120 can be inclined.

As such, the fixed tunnel 110 can be rotated up and down with respect to the rotunda 120. Thus, the present boarding bridge can be docked on the airplane, on which the boarding bridge can be conventionally docked by inclining only the movable tunnel 130 at 4.7 degrees, for example, by adjusting a height of the rotunda 120 to incline the fixed tunnel 110 at 2.4 degrees and incline the movable tunnel 130 at 2.3 degrees. Therefore, the present boarding bridge can maintain an overall gentle inclination, as compared with a conventional one, and thus enables the passengers to move more conveniently.

Particularly, as described above, it is possible to appropriately adjust the inclination of the fixed tunnel 110 in order for the movable tunnel 130 not to be inclined to the limited angle and thus possible to offer convenience to the disabled.

Herein, the fixed tunnel 110 may be rotated to 4.7 degrees up and down with respect to the rotunda 120.

That is, as illustrated in FIG. 2, a is a rotation angle when the fixed tunnel 110 is rotated in an upward direction with respect to the rotunda 120. The a may be up to 4.7 degrees. Further, b is a rotation angle when the fixed tunnel 110 is rotated in a downward direction with respect to the rotunda 120. The b may be up to 4.7 degrees.

Thus, the fixed tunnel 110 as well as the movable tunnel 130 is designed to be rotatable while following the rules prescribed in the Korean Law, so that a range of available airplanes may be extended and the boarding bridge may have a gentle inclination.

To be specific, an inclination of the movable tunnel 130 can be adjusted to 4.7 degrees up and down and an inclination of the fixed tunnel 110 can also be adjusted to 4.7 degrees up and down. Thus, the overall inclination of the boarding bridge can be adjusted to 9.4 degrees up and down. Therefore, the boarding bridge service can be provided to various airplanes, as compared with a conventional case.

Further, as described above, the present boarding bridge can be docked on the airplane, on which the boarding bridge can be conventionally docked by inclining only the movable tunnel 130 at 4.7 degrees, for example, by inclining the movable tunnel 130 to 2.3 degrees since the fixed tunnel 110 is adjusted to 2.4 degrees. Thus, the boarding bridge may have a gentle inclination.

In the fixed tunnel 110, there may be provided a hinge unit to be rotatable up and down with respect to the rotunda 120.

The hinge unit may include the first hinge unit 111 provided at one end of the fixed tunnel 110. Further, the hinge unit may include the second hinge unit 113 provided at the other end of the fixed tunnel 110.

Referring to FIG. 2, if the rotunda 110 is raised, the first hinge unit 111 and the second hinge unit 113 may be driven such that the fixed tunnel 110 can be inclined as the other end of the fixed tunnel 110 is raised together with the rotunda 110.

The first hinge unit 111 may include a first hinge 1111 provided at any one of one end of the fixed tunnel 110 and the terminal 150, or any one of the one end of the fixed tunnel 110 and the extended fixed tunnel 190. Further, the first hinge unit 111 may include a first hinge fixing member 1113 provided at the other one of the one end of the fixed tunnel 110 and the terminal 150, or the other one of the one end of the fixed tunnel 110 and the extended fixed tunnel 190.

Herein, the first hinge 1111 or the first hinge fixing member 1113 may be provided at a lower part of the one end of the fixed tunnel 110. Therefore, when the hinge is driven, a lower part of the fixed tunnel 110 is not separated from a lower part of the terminal 150, or the lower part of the fixed tunnel 110 is not separated from a lower part of the extended fixed tunnel 190, but an upper part of the fixed tunnel 110 is separated from or brought into contact with an upper part of the terminal 150, or the upper part of the fixed tunnel 110 is separated from or brought into contact with an upper part of the extended fixed tunnel 190. Therefore, when passengers move therein, the safety of the passengers can be guaranteed.

By way of example, the first hinge 1111 may be connected to the one end of the fixed tunnel 110 as illustrated in FIG. 2 and FIG. 3.

Herein, as illustrated in FIG. 2 and FIG. 3, the other end of the first hinge 1111 may be connected to a bottom surface of the one end of the fixed tunnel 110. Further, one end of the first hinge 1111 may be connected to the first hinge fixing member 1113. Thus, the first hinge 1111 may be rotated up and down around the one end connected to the first hinge fixing member 1113, so that an inclination of the fixed tunnel 110 can be adjusted.

Further, the first hinge fixing member 1113 may be provided at a wall surface of the terminal 150 as illustrated in FIG. 1 and FIG. 2. Otherwise, as illustrated in FIG. 3, the first hinge fixing member 1113 may be provided at the extended fixed tunnel 190. However, a position of the first hinge fixing member 1113 is not limited thereto, and the first hinge fixing member 1113 may be provided at various places such as a terminal support 151 or an extended fixed tunnel support 191 (see FIG. 3).

The second hinge unit 113 may include a second hinge 1131 provided at any one of the other end of the fixed tunnel 110 and one end of the rotunda 120. Further, the second hinge unit 113 may include a second hinge fixing member 1133 provided at the other one of the other end of the fixed tunnel 110 and the one end of the rotunda 120.

Herein, the second hinge 1131 or the second hinge fixing member 1133 may be provided at a lower part of the other end of the fixed tunnel 110. Therefore, when the hinge is driven, a lower part of the fixed tunnel 110 is not separated from a lower part of the rotunda 120, but an upper part of the fixed tunnel 110 is separated from or brought into contact with an upper part of the rotunda 120. Therefore, when passengers move therein, the safety of the passengers can be guaranteed.

By way of example, the second hinge 1131 may be connected to the other one end of the fixed tunnel 110 as illustrated in FIG. 2 and FIG. 3.

Herein, as illustrated in FIG. 2 and FIG. 3, one end of the second hinge 1131 may be connected to a bottom surface of the other end of the fixed tunnel 110. Further, the other end of the second hinge 1131 may be connected to the second hinge fixing member 1133. Thus, the second hinge 1131 may be rotated up and down around the other end connected to the second hinge fixing member 1133, so that an inclination of the fixed tunnel 110 can be adjusted.

Further, the second hinge fixing member 1133 may be provided at a lower part of the rotunda 120 as illustrated in FIG. 1 to FIG. 3. However, a position of the second hinge fixing member 1133 is not limited thereto, and the second hinge fixing member 1133 may be provided at various places such as the rotunda column 121.

Referring to FIG. 5, any one of the first hinge 1111 and the second hinge 1131 may be a sliding hinge. Herein, the first hinge fixing member 1113 may include a first hinge guide part to enable the first hinge 1111 to be slid and moved.

Further, the second hinge fixing member 1133 may include a second hinge guide part to enable the second hinge 1131 to be slid.

By way of example, the first hinge guide part may be a first hinge rail 1113b formed in a first hinge guide groove 1113a as illustrated in FIG. 5. Further, the second hinge guide part may be a second hinge rail 1133b formed in a second hinge guide groove 1133a as illustrated in FIG. 5. Hereinafter, there will be described the case where the first hinge guide part and the second hinge guide part are the first hinge rail 1113b and the second hinge rail 1133b, respectively.

Referring to FIG. 5, the first hinge rail 1113b and the second hinge rail 1133b may be securely fixed to a lower part of the terminal 150 and a lower part of the rotunda 120, respectively, by welding. Further, a lower part of the first hinge rail 1113b and a lower part of the second hinge rail 1133b are supported by a first stay 1113c and a second stay 1133c welded to the lower part of the terminal 150 and the lower part of the rotunda 120, respectively, and, thus, more securely fixed thereto. Herein, desirably, the circumferences of the first guide groove 1113a and the second guide groove 1133a may be walled up such that the first hinge 1111 and the second hinge 1113 can be moved in a horizontal direction within a predetermined section without deviating to the side.

Further, lengths of the first guide groove 1113a and the second guide groove 1133a in a horizontal direction may be determined in proportion to a length of the fixed tunnel 110.

Referring to FIG. 5, the first hinge 1111 may include a first hinge wheel 1111a moving within the first guide groove 1113a. Herein, the first hinge wheel 1111a is connected to a first knuckle joint 1111c by a first connection shaft 1111b and the first knuckle joint 1111c is welded to a lower part of the fixed tunnel 110. Thus, the first hinge wheel 1111a can be connected to the lower part of the fixed tunnel 110. The first connection shaft 1111b transfers force generated by a sliding movement of the first hinge wheel 1111a to the first knuckle joint 1111c. Thus, when the rotunda 120 is raised or lowered, the first connection shaft 1111b enables the fixed tunnel 110 to be also moved in a horizontal direction.

Likewise, referring to FIG. 5, the second hinge 1113 may include a second hinge wheel 1131a moving within the second guide groove 1133a. Herein, the second hinge wheel 1131a is connected to a second knuckle joint 1131c by a second connection shaft 1131b and the second knuckle joint 1131c is welded to a lower part of the fixed tunnel 110. Thus, the second hinge wheel 1131a can be connected to the lower part of the fixed tunnel 110. The second connection shaft 1131b transfer force generated by a sliding movement of the second hinge wheel 1131a to the second knuckle joint 1131c. Thus, when the rotunda 120 is raised or lowered, the second connection shaft 1131b enables the fixed tunnel 110 to be also moved in a horizontal direction.

If any one of the first hinge 1111 and the second hinge 1131 is a sliding hinge, an effect of a sliding movement thereof is as follows.

Figure 6:
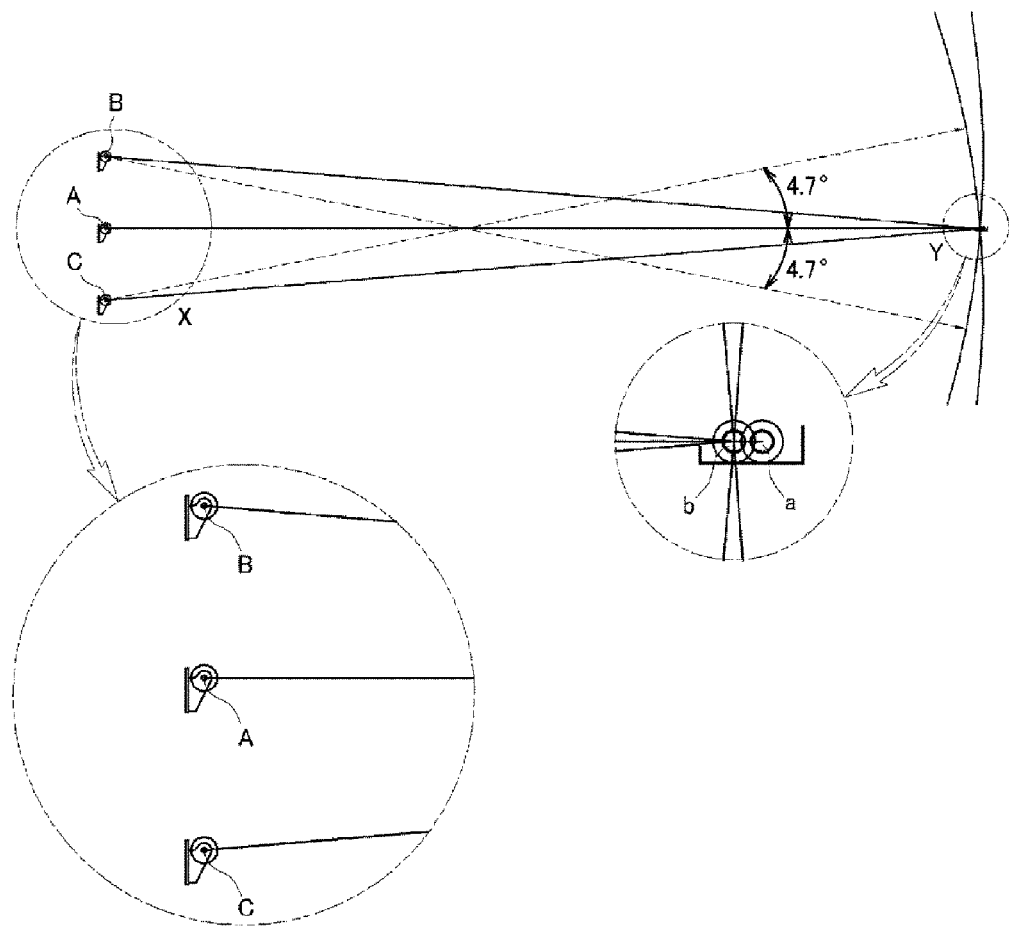
FIG. 6 and FIG. 7 are conceptual diagrams provided to describe an operation of a sliding hinge when a rotunda is raised if a first hinge or a second hinge is the sliding hinge.

By way of example, if the first hinge 1111 is a sliding hinge as illustrated in FIG. 4 and the second hinge 1131 is a fixed hinge as illustrated in FIG. 3, referring to FIG. 6, Y represents a sliding movement of the first hinge 1111 according to inclination of the fixed tunnel 110 caused by raising or lowering of the rotunda 120, and X represents a movement of the second hinge 1131 according to inclination of the fixed tunnel 110 caused by raising or lowering of the rotunda 120.

Figure 7:
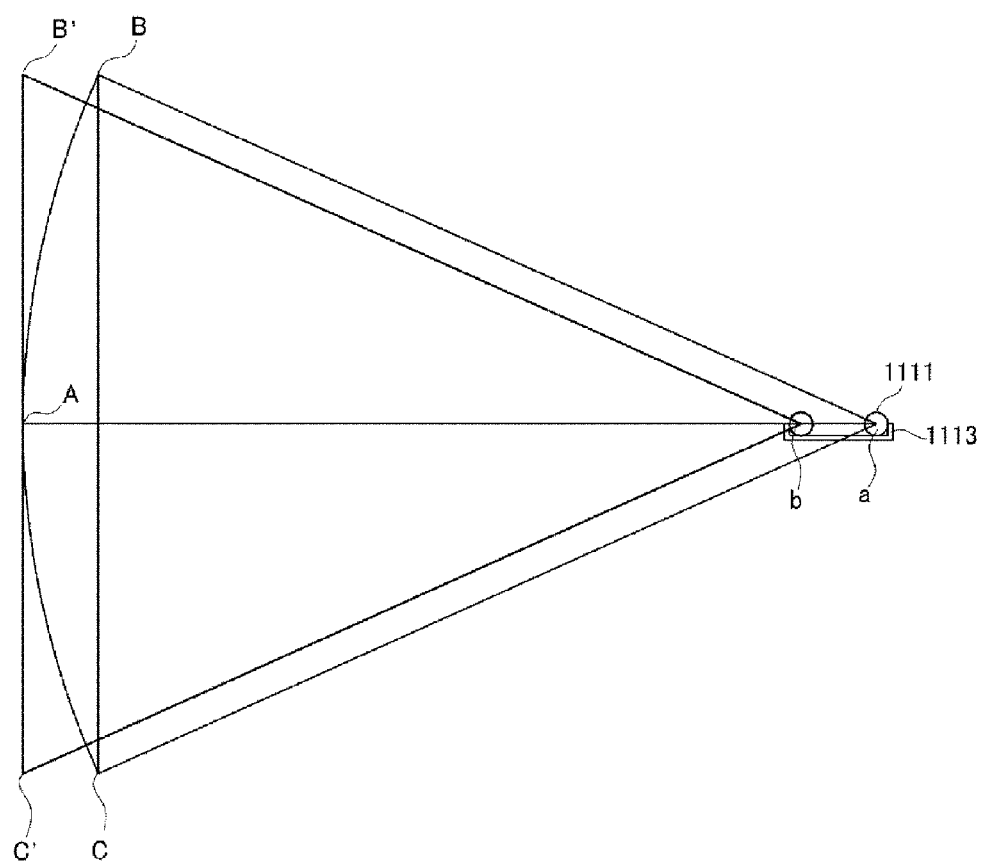

To be more specific, referring to FIG. 7, the rotunda 120 is raised in a vertical direction. Thus, the rotunda 120 is moved from A to B'. Meanwhile, when the rotunda 120 is raised, if the first hinge 1111 is a fixed hinge like the second hinge 1131, the second hinge 1131 is moved from A to B. Therefore, if all of the first hinge 1111 and the second hinge 1131 are fixed hinges, when the rotunda 120 is raised, a pulling force may be applied to the rotunda 120 or the rotunda 120 may not be raised smoothly. Thus, by sliding and moving the first hinge 1111 from a position a to a position b to move the second hinge 1131 not only in a vertical direction but also in a horizontal direction, i.e., from A to B', the rotunda 120 can be raised smoothly.

On the other hand, referring to FIG. 7, the rotunda 120 is lowered in a vertical direction. Thus, the rotunda 120 is moved from A to C'. Meanwhile, when the rotunda 120 is lowered, if the first hinge 1111 is a fixed hinge like the second hinge 1131, the second hinge 1131 is moved from A to C. Therefore, if all of the first hinge 1111 and the second hinge 1131 are fixed hinges, when the rotunda 120 is raised, a pulling force may be applied to the rotunda 120 or the rotunda 120 may not be raised smoothly. Thus, by sliding and moving the first hinge 1111 from the position a to the position b to move the second hinge 1131 not only in a vertical direction but also in a horizontal direction, i.e., from A to C', the rotunda 120 can be raised smoothly.

Herein, FIG. 7 exaggerates the angles or the like for convenience in explanation. The angles illustrated in FIG. 7 may be limited to 4.7 degrees as illustrated in FIG. 6.

By way of example, if the rotunda 120 is raised as high as possible until an inclination of the fixed tunnel 110 reaches 4.7 degrees, when a length of the fixed tunnel 110 is 20 M, the first hinge 1111 may be slid and moved as much as about 67.3 mm from a to b. On the other hand, if the rotunda 120 is lowered as low as possible until an inclination of the fixed tunnel 110 reaches 4.7 degrees, when a length of the fixed tunnel 110 is 20 M, the first hinge 1111 may be slid and moved as much as about 67.3 mm from a to b. In this case, a horizontal direction length of the first hinge guide groove 1112 may be about 10 cm.

If any one of the first hinge 1111 and the second hinge 1113 is a sliding hinge, the other one may be a fixed hinge as illustrated in FIG. 3.

A third hinge unit 123 may be provided at one end of the movable tunnel 130 to be rotatable up and down with respect to the rotunda 120.

The third hinge unit 123 may include a third hinge 1231 provided at any one of one end of the movable tunnel 130 and the other end of the rotunda 120. Further, the third hinge unit 123 may include a third hinge fixing member 1233 provided at the other one of the one end of the movable tunnel 130 and the other end of the rotunda 120.

Herein, the third hinge 1231 or the third hinge fixing member 1233 may be provided at a lower part of the one end of the movable tunnel 130.

By way of example, the third hinge 1231 may be connected to the one end of the movable tunnel 130 as illustrated in FIG. 2. Therefore, when the hinge is driven, a lower part of the rotunda 120 is not separated from a lower part of the movable tunnel 130, but an upper part of the rotunda 120 is separated from or brought into contact with an upper part of the movable tunnel 130. Therefore, when passengers move therein, the safety of the passengers can be guaranteed.

Herein, as illustrated in FIG. 1 to FIG. 3, the other end of the third hinge 1231 may be connected to a bottom surface of the one end of the movable tunnel 130. Further, one end of the third hinge 1231 may be connected to the third hinge fixing member 1233. Thus, the third hinge 1231 may be rotated up and down around the one end connected to the third hinge fixing member 1233, so that an inclination of the movable tunnel 130 can be adjusted.

Further, the third hinge fixing member 1233 may be provided at a lower part of the rotunda 120 as illustrated in FIG. 1 to FIG. 3. However, a position of the third hinge fixing member 1233 is not limited thereto, and the third hinge fixing member 1233 may be provided at various places such as the rotunda column 121.

Hereinafter, a boarding bridge height control system according to an exemplary embodiment of the present disclosure (hereinafter, referred to as "the present boarding bridge height control system") will be described.

The present boarding bridge height control system is configured to raise or lower the rotunda 120 included in the present boarding bridge. Herein, the present boarding bridge height control system can be applied to each of a single boarding bridge or multiple boarding bridges.

The present boarding bridge height control system includes a flight management server 10.

In the flight management server 10, flight information including information about arrival gates for airplanes, information about flight numbers parked at respective gates, and information about airplane types is stored. The flight information may be transmitted and shared via an aeronautical telecommunication network (not illustrated).

Figure 11:
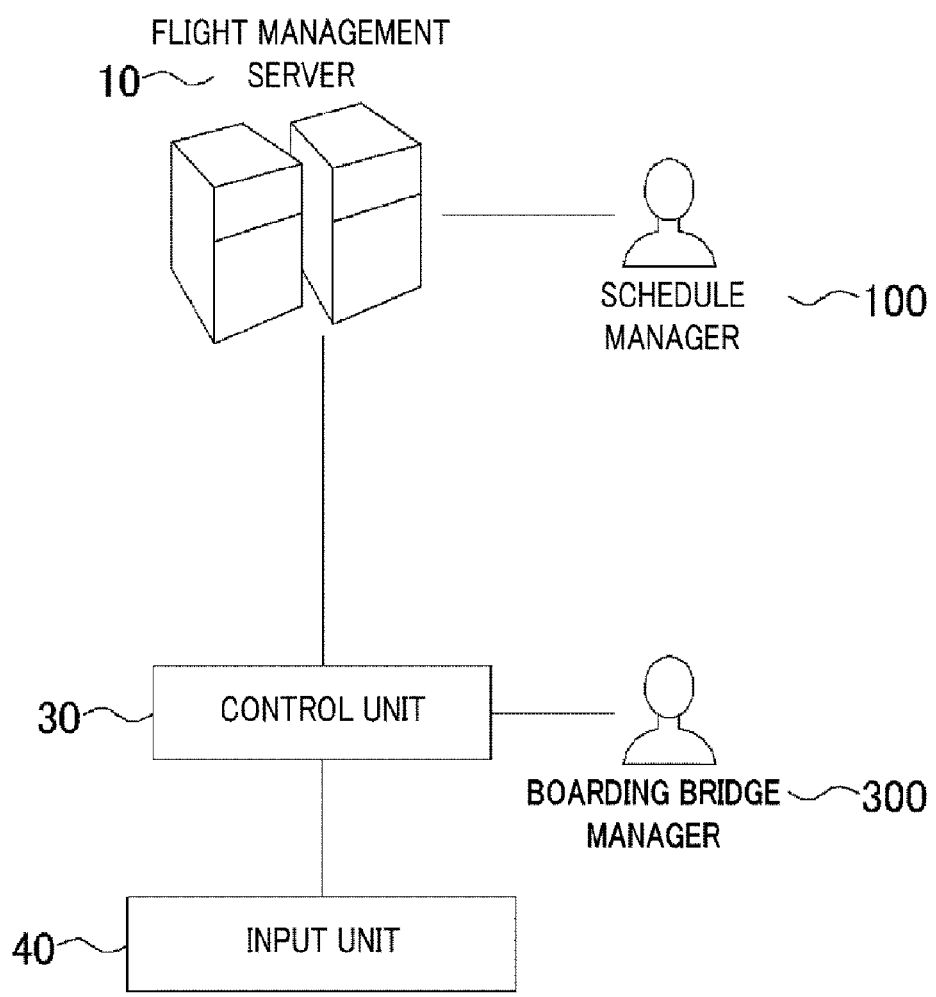
FIG. 11 is a configuration view illustrating a method for controlling a height of a boarding bridge through a boarding bridge height control system according to an exemplary embodiment of the present disclosure.

Referring to FIG. 11, a schedule manager 100 may update the flight information in the flight management server 10 in real time by inputting accurate information of real-time changed flight information to the flight management server 10.

The flight management server 10 may transmit the flight information to a control unit 30 to be described later.

The present boarding bridge height control system may include an input unit 40.

The input unit 40 may transmit input information for raising or lowering the rotunda 120.

By way of example, the input unit 40 may receive input information since information about airplane types is directly input by an operator. By way of example, the operator may directly input information about airplane types to the input unit 40 by pressing an airplane type select button illustrated in FIG. 12.

Otherwise, the input unit 40 may receive input information since information about raising or lowering of the rotunda 120 is input by the operator. Therefore, the operator may discretionally set degrees of raising and lowering of the rotunda 120 and thus manually control raising and lowering of the rotunda 120.

Referring to FIG. 11, the input unit 40 may transmit the input information to the control unit 30 to be descried below.

The present boarding bridge height control system may include the control unit 30.

Referring to FIG. 11, the control unit 30 may receive the flight information from the flight management server 10 or receive the input information from the input unit 40 to raise or lower the rotunda 120.

Herein, a boarding bridge manager 300 may monitor and control an operation of the boarding bridge and may also monitor and control an adjustment of a height of the rotunda 120.

The control unit 30 may raise or lower the rotunda 120 to a predetermined height according to the flight information or the input information.

The control unit 30 may receive data about flight numbers from the flight management server 10 and raise or lower the rotunda 120 to a predetermined height for a corresponding airplane type at a gate (or parking ramp) where the airplane is parked.

By way of example, in the control unit 30, data about buildings (e.g., terminal) positioned in respective parking ramps, level values of parking positions of airplanes (e.g., differences in height and horizontal distance between buildings and parking positions of airplanes), predetermined heights of the rotunda 120, and the like may be stored.

By way of example, if an airplane which will arrive in about 20 minutes and enter a specific gate is B-747, data about a corresponding airplane type are displayed on an operation monitor (which normally displays information about a length and a height of a boarding bridge, an inclination and an internal temperature of a tunnel, etc.) provided at a boarding bridge operating panel and the rotunda 120 may be raised or lowered according to information stored in a parking ramp for the airplane.

Figure 12:
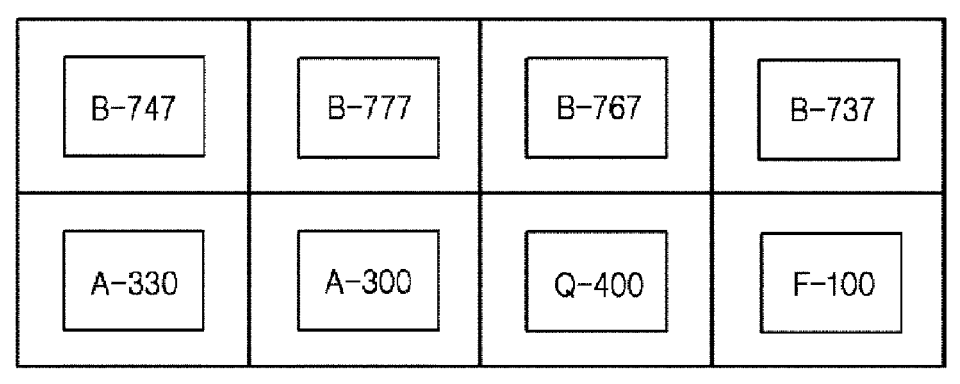

Further, the control unit 30 may receive information about airplane types input to the input unit 40 by the operator by pressing the airplane type select button (e.g., the button as illustrated in FIG. 12) and raise or lower the rotunda 120 to a predetermined height for a corresponding airplane type.

Furthermore, the control unit 30 may classify airplanes into multiple groups according to door sill height, set predetermined heights for the respective groups, and raise or lower the rotunda 120 to a predetermined height for a group of a corresponding airplane.

The control unit 30 may receive information about airplane types from the flight management server 10 or the input unit 40, determine which group a corresponding airplane belongs to, and automatically raise or lower the rotunda 120 to a predetermined height for the corresponding group.

A status of raising or lowering of the rotunda 120 may be monitored through the control unit 30.

By way of example, in the present boarding bridge height control system, an operation monitor may be provided to display a status of the rotunda 120. With the operation monitor, a status of raising lowering of the rotunda 120 may be manually monitored by the boarding bridge manager 300, or may be automatically monitored by the control unit 30.

Conventionally, the rotunda 120 is fixed and supported by the rotunda column. Therefore, a height of the rotunda 120 is uniformly maintained. The Korean Law and IATA limit an inclination of a slope of a boarding bridge to 4.7 degrees up and down. If a boarding bridge is designed following the rules, a height of a rotunda is fixed and an inclination of a movable tunnel can be adjusted only in a predetermined range. Thus, airplane types available for the boarding bridge are limited.

However, in the present boarding bridge, the rotunda column 121 can raise and lower the rotunda 120 and an inclination of the fixed tunnel 110 can be adjusted accordingly. Thus, airplane types available for the boarding bridge can be diversified. Further, the boarding bridge may have an overall gentle inclination, as compared with a conventional one, and thus enables the passengers and the disabled to move more conveniently.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A boarding bridge comprising:
a fixed tunnel of which one end is connected to a terminal or an extended fixed tunnel; and
a rotunda of which one end is connected to the other end of the fixed tunnel and which is supported by a rotunda column,
a movable tunnel configured to connect the rotunda to an airplane, wherein the movable tunnel is connected to the other end of the rotunda, and the other side of the movable tunnel is raised or lowered; and
a first hinge unit including a first hinge provided at any one of one end of the fixed tunnel and the terminal, or any one of the one end of the fixed tunnel and the extended fixed tunnel, and a first hinge fixing member provided at the other one of the one end of the fixed tunnel and the terminal, or the other end of the one end of the fixed tunnel and the extended fixed tunnel, wherein the first hinge is a sliding hinge and the first hinge fixing member includes a first hinge guide part to enable the first hinge to be slid and moved,
wherein the rotunda column is driven to raise or lower the rotunda
wherein the rotunda column includes a raising and lowering unit, and the rotunda is raised or lowered by the raising and lowering unit,
wherein the raising and lowering unit includes a hydraulic device, and the hydraulic device includes a hydraulic power unit configured to generate a hydraulic power and a hydraulic hose configured to transfer the hydraulic power generated from the hydraulic unit,
wherein a driving unit configured to raise or lower the other side of the movable tunnel is provided on the other side of the movable tunnel, the driving unit is driven with a hydraulic power,
wherein the driving unit is connected to a hydraulic hose of the hydraulic device and receives a driving force to raise or lower the other side of the movable tunnel from the hydraulic hose.

2. The boarding bridge of claim 1,
wherein the raising and lowering unit includes a screw jack.

3. The boarding bridge of claim 1,
wherein an operation of the rotunda column is controlled through an operating panel, and
the operating panel drives the rotunda column according to a height of an airplane, on which the boarding bridge is docked, before a predetermined time from an arrival time of the airplane.

4. The boarding bridge of claim 1,
wherein the hydraulic hose includes:
a first flexible part which is flexibly connected to the hydraulic power unit to maintain the connection when the rotunda is raised or lowered; and
a second flexible part which is flexibly connected to the driving unit to maintain the connection when the other side of the movable tunnel is raised or lowered.

5. The boarding bridge of claim 4,
wherein the hydraulic hose further includes:
a third flexible part which is flexibly connected to a cable chain to maintain the connection when an extended tunnel extendably connected to the movable tunnel in a longitudinal direction is slid and moved.

6. The boarding bridge of claim 5,
wherein the first flexible part is provided on one side of the movable tunnel and the second flexible part is provided on the other side of the movable tunnel, and
the second flexible part is flexibly maintained with respect to a greater amount of vertical movement than the first flexible part.

7. The boarding bridge of claim 1,
wherein the fixed tunnel includes:
a first fixed tunnel connected to the rotunda; and
a second fixed tunnel connected to the rotunda to be arranged in parallel to the first fixed tunnel.

8. The boarding bridge of claim 1, further comprising:
a movable tunnel configured to connect the rotunda to an airplane,
wherein each of the rotunda and the movable tunnel is multiple in number,
a head unit connected to the multiple rotundas is provided at the other end of the fixed tunnel, and
the movable tunnels are connected to the rotundas one to one.

9. A boarding bridge height control system configured to raise or lower the rotunda included in the boarding bridge of claim 1, the boarding bridge height control system comprising:
a flight management server in which data of flight information including information about arrival gates for airplanes, information about flight numbers parked at respective gates, and information about airplane types are stored and updated; and
a control unit configured to receive the flight information from the flight management server and raise or lower the rotunda.

10. The boarding bridge height control system of claim 9,
wherein the control unit raises or lowers the rotunda to a predetermined height according to the flight information and
the control unit classifies the airplanes into multiple groups according to door sill height, sets predetermined heights for the respective groups, and raises or lowers the rotunda to a predetermined height for a group of a corresponding airplane.

* * * * *